United States Patent
Kusachi et al.

(10) Patent No.: US 8,185,668 B2
(45) Date of Patent: May 22, 2012

(54) SYSTEM HAVING PROCESSOR AND I/O CONTROLLER

(75) Inventors: Souta Kusachi, Kawasaki (JP); Go Sugizaki, Kawasaki (JP); Satoshi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 12/608,231

(22) Filed: Oct. 29, 2009

(65) Prior Publication Data

US 2010/0125687 A1   May 20, 2010

(30) Foreign Application Priority Data

Nov. 14, 2008   (JP) .................................. 2008-292721

(51) Int. Cl.
*G06F 3/00* (2006.01)

(52) U.S. Cl. ................... 710/6; 710/5; 710/15; 710/20; 710/21; 710/33; 710/58

(58) Field of Classification Search ............... 710/5, 15, 710/20, 21, 33, 58
See application file for complete search history.

(56) References Cited

U.S. PATENT DOCUMENTS

| | | | |
|---|---|---|---|
| 6,167,492 A * | 12/2000 | Keller et al. ............... 711/154 |
| 6,275,913 B1 | 8/2001 | Jeddeloh |
| 6,681,320 B1 * | 1/2004 | Marr ............................ 712/216 |
| 7,921,249 B2 * | 4/2011 | Sullivan et al. ............... 710/110 |
| 2002/0019903 A1 | 2/2002 | Lin |
| 2008/0244134 A1 | 10/2008 | Hosomi et al. |

FOREIGN PATENT DOCUMENTS

| | | |
|---|---|---|
| JP | 04-190435 | 7/1992 |
| JP | 6-187231 | 7/1994 |
| JP | 06-187231 | 7/1994 |
| JP | 2007-148507 | 6/2007 |
| WO | 2006/004196 | 1/2006 |

OTHER PUBLICATIONS

Extended European Search Report for corresponding European Application 09173661.1-2212; dated Apr. 12, 2010.

* cited by examiner

*Primary Examiner* — Tariq Hafiz
*Assistant Examiner* — Jasjit Vidwan
(74) *Attorney, Agent, or Firm* — Staas & Halsey LLP

(57) ABSTRACT

A method of controlling an apparatus including a processor and an I/O controller includes storing execution information, receiving a first and a second requests successively, determining whether initiation of each execution of the first and the second requests is to be supervised by either of the processor and the I/O controller in reference to the execution information, transmitting the first request to the processor from the I/O controller, and upon completion of execution of the first request at the processor, transmitting the second request to the processor from the I/O controller when the initiations of executions of the first and second request is supervised by the I/O controller, and transmitting the first and second requests to the processor regardless of completion of execution of the first request by the processor when the initiations of executions of the first and second requests is supervised by the processor.

19 Claims, 12 Drawing Sheets

FIG. 4

| | PRECEDENT REQUEST | SUBSEQUENT REQUEST | ORDER CONTROL UNIT |
|---|---|---|---|
| (1) | ALL DMA Write | Strong-Ordered DMA Write | CPU & IOC |
| (2) | ALL DMA Write | Interrupt | CPU & IOC |
| (3) | ALL DMA Write | RESPONSE TO PIO Read | IOC |
| (4) | ALL DMA Write | Zero Byte Read | IOC |
| (5) | ALL DMA Read | ALL DMA Read/Write TO THE SAME ADDRESS AS THE PRECEDENT REQUEST | IOC |
| (6) | ALL DMA Write | ALL DMA Read/Write TO THE SAME ADDRESS AS THE PRECEDENT REQUEST | CPU & IOC |

(1) ZeroByteRead IS COMPLETED INSIDE IOC
(2) RESPONSE TO PIO Read TO BE COMPLETED INSIDE CPU WITHOUT PASSING CONTROL UNIT AND PIPELINE

FIG. 13

| | PRECEDENT REQUEST | SUBSEQUENT REQUEST | ORDER CONTROL UNIT |
|---|---|---|---|
| (1) | ALL DMA Write | Strong-Ordered DMA Write | IOC |
| (2) | ALL DMA Write | Interrupt | |
| (3) | ALL DMA Write | RESPONSE TO PIO Read | |
| (4) | ALL DMA Write | Zero Byte Read | |
| (5) | ALL DMA Read | ALL DMA Read/Write TO THE SAME ADDRESS AS THE PRECEDENT REQUEST | |
| (6) | ALL DMA Write | ALL DMA Read/Write TO THE SAME ADDRESS AS THE PRECEDENT REQUEST | |

SYSTEM HAVING PROCESSOR AND I/O CONTROLLER

CROSS-REFERENCE TO RELATED APPLICATION

This application is based upon and claims the benefit of priority of the prior Japanese Patent Application No. 2008-292721, filed on Nov. 14, 2008, the entire contents of which are incorporated herein by reference.

FIELD

A certain aspect of the embodiments discussed herein is related to a system having a processor and an I/O controller.

BACKGROUND

A system board which partially constitutes an information apparatus is structured to control orders between sequential requests in response to a reception of an IO request. The IO request needs the order guarantee such that the subsequent request does not skip the precedent request. Upon request of the memory access, the system board controls the order to transmit the subsequent request to the memory after completion of the memory access based on the precedent request.

An IOC (Input/Output Controller) of the system board issues the subsequent request after receiving the response with respect to the memory access establishment. The IOC keeps the subsequent request for the period from transmission of the precedent request to the reception of the response. Thus, it costs a long time from reception of the request to completion of processing the subsequent request.

Arts disclosed in Japanese Laid-open Patent Publication No. 06-187231, Japanese Laid-open Patent Publication No. 04-190435, and Japanese Laid-open Patent Publication No. 2007-148507 have been proposed.

SUMMARY

According to an aspect of an embodiment, a method of controlling an apparatus including a processor and an I/O controller for transmitting or receiving a request, includes storing execution information indicating either of the processor and the I/O controller is to supervise initiations of executions of successive requests in accordance with combinations of the types of the successive requests, receiving a first and a second requests successively by the I/O controller, determining whether initiation of each execution of the first and the second requests is to be supervised by either of the processor and the I/O controller in reference to the execution information by the I/O controller, transmitting the first request to the processor from the I/O controller, and upon completion of execution of the first request at the processor, transmitting the second request to the processor from the I/O controller when initiations of execution of the first and second request is supervised by the I/O controller, and transmitting the first and second requests to the processor regardless of completion of execution of the first request by the processor when the initiations of executions of the first and second requests is supervised by the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory view illustrating an example of a control unit table;

FIG. 13 is an explanatory view illustrating the related art.

DESCRIPTION OF EMBODIMENTS

Figure 1:
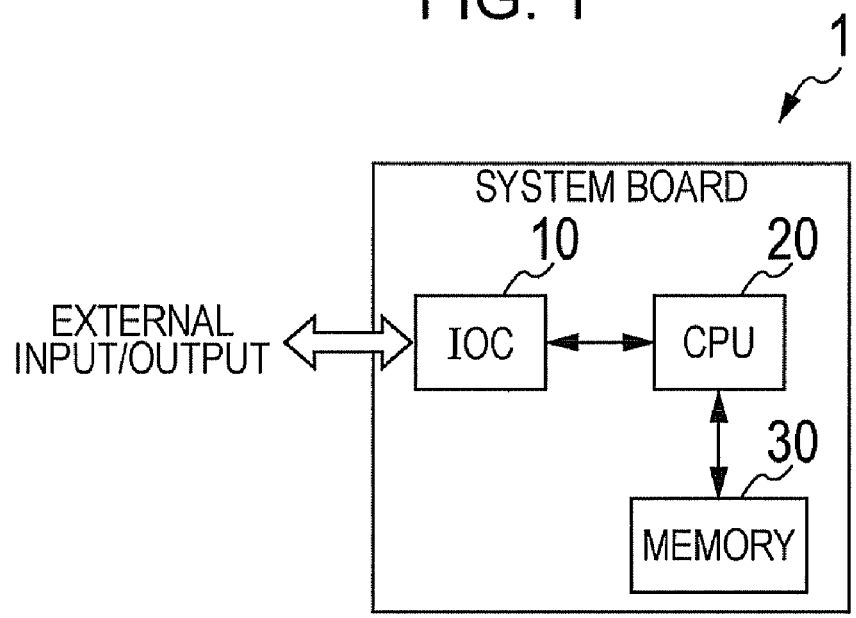
FIG. 1 is a block diagram illustrating a structure of a system board according to an embodiment 1.

Examples of a request order control system, a request order control method and a request order control program according to the present art will be described referring to the drawings.

Figure 11:
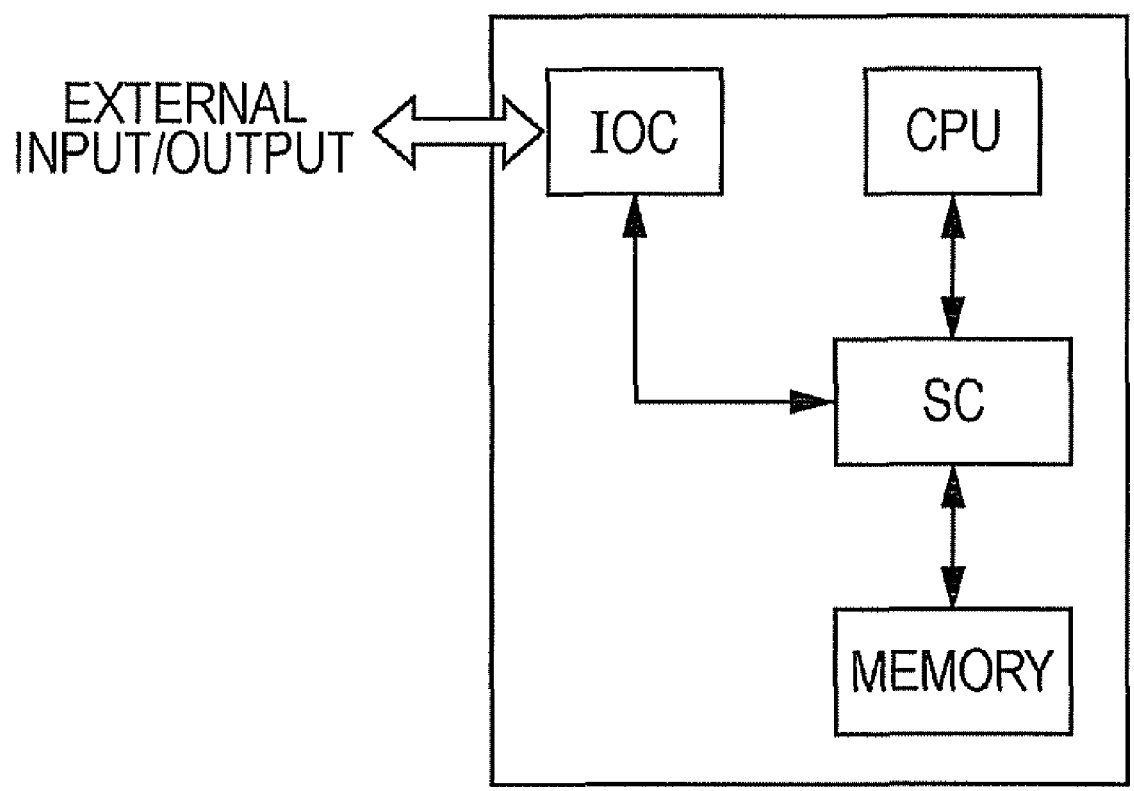
FIG. 11 is an explanatory view illustrating the related art.

Referring to FIG. 11, a CPU (Central Processing Unit), a SC (System Controller), an IOC (External Input/Output Controller) and a memory are mounted on the system board. The above-structured system board serves to transfer the IO request in the order of the IOC, the SC, and the memory.

Figure 12:
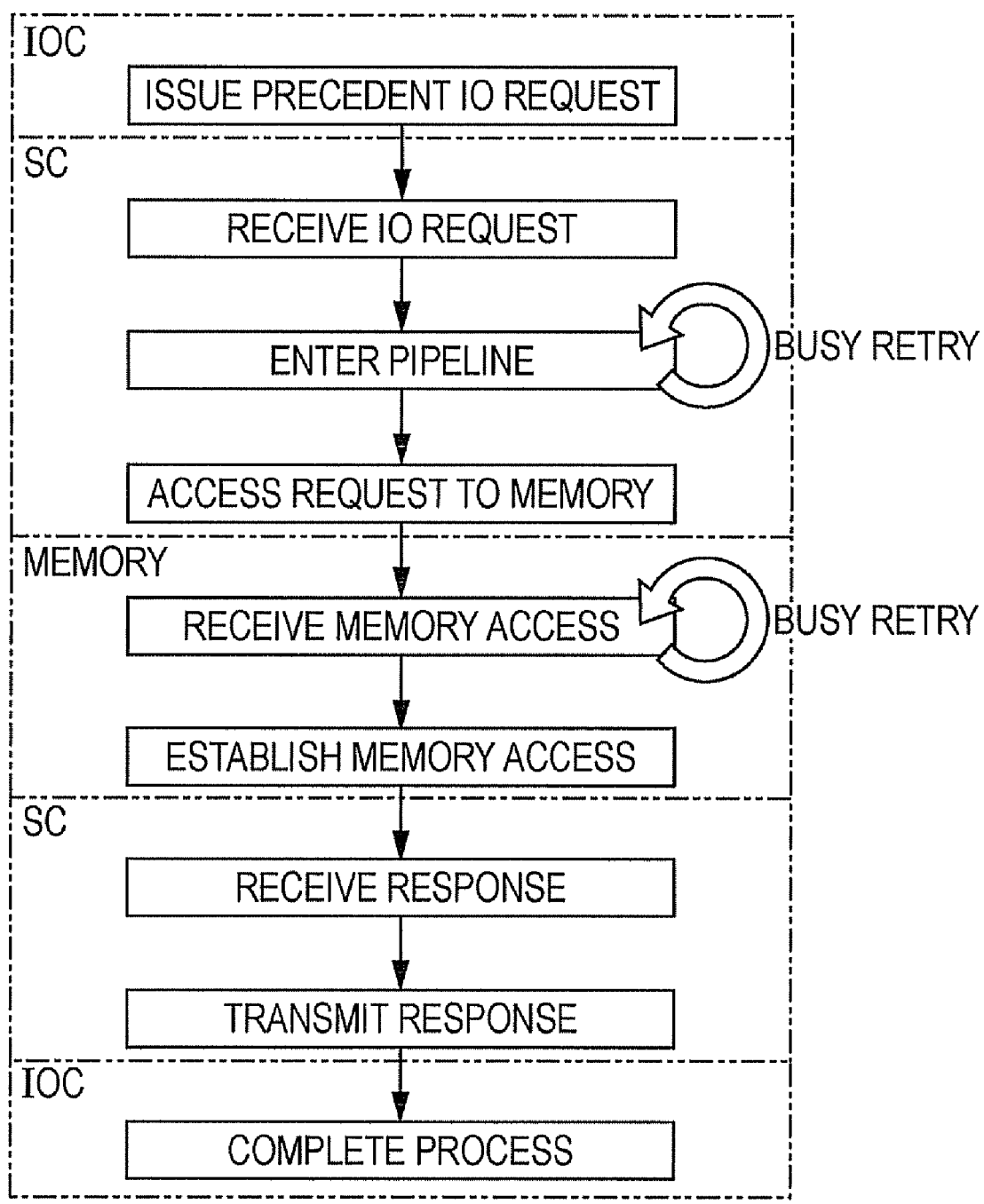
FIG. 12 is an explanatory view illustrating the related art.

Referring to FIG. 12, when the IOC receives the request which needs the order guarantee from the external input, the system board issues the precedent request to the SC. Upon reception of the precedent request from the IOC, the SC enters the precedent request to the pipeline, and sends out a memory access request to the memory.

When the memory access is established, the SC transmits the response with respect to the memory access establishment to the IOC. After receiving the response with respect to the memory access establishment from the SC, the IOC issues the subsequent request to the SC. The IOC executes the order guarantee with respect to all the IO requests which need the order guarantee as illustrated in FIG. 13.

Embodiment 1

In the following examples, the structure and process flow of the system board according to embodiment 1 will be described first, and then the advantage of embodiment 1 will be described. An example of the system board which functions as the CPU and the SC will be described hereinafter.

System Board Structure:

A system board 1 according to embodiment 1 will be described first referring to FIG. 1. FIG. 1 is a block diagram illustrating the structure of the system board 1 according to embodiment 1. Referring to FIG. 1, the system board 1 according to embodiment 1 includes an IOC 10, a CPU 20, and a memory 30 ("Memory" illustrated in the drawing, which applies to the description below), which are connected with one another via a bus and the like. Each process flow of the respective elements will be described.

The IOC 10 controls the signal transmission/reception to/from outside the system board 1. When the request which needs the order guarantee is received from the external device, the IOC 10 according to embodiment 1 issues a precedent request, and then a subsequent request to the CPU 20. The processing executed by the IOC 10 will be described in more detail later referring to FIG. 3.

The CPU 20 controls a packet transmission/reception between the IOC 10 and the memory 30, and executes various types of calculation and data processing. In embodiment 1, the CPU 20 enters the precedent request or the subsequent request received from the IOC to a pipeline to access the memory 30. The processing executed by the CPU 20 will be described in more detail later referring to FIG. 6.

The memory 30 stores data for executing various types of processings. Specifically, the memory 30 receives the request from the CPU 20, and accepts the access to execute Read/Write processings.

Figure 2:
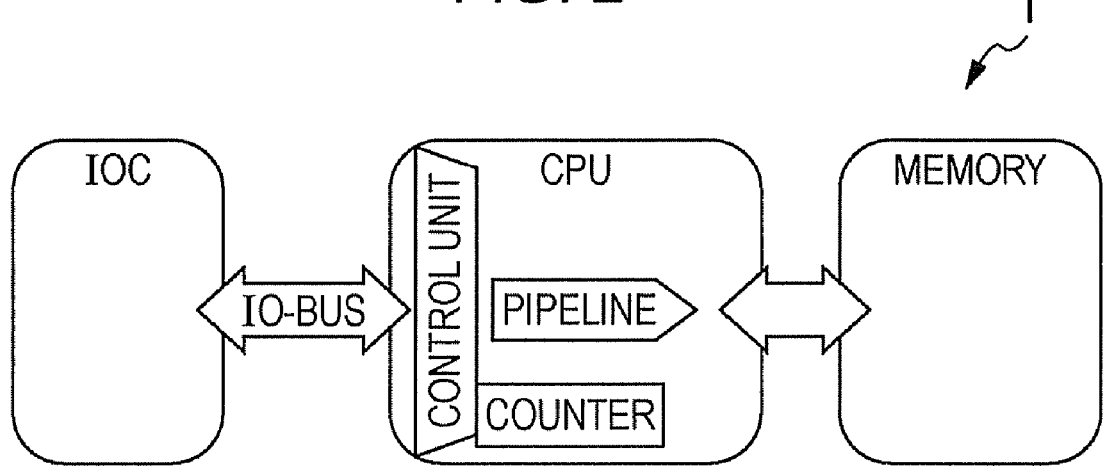
FIG. 2 is a view illustrating a packet path from an IOC to a memory.

A packet path from the IOC 10 to the memory 30 will be described referring to FIG. 2. Referring to FIG. 2, in the system board 1, the IOC 10 is connected to the memory 30 via the CPU 20. The IOC 10 is connected to the CPU 20 via an IO bus, that is, the IOC-CPU bus. In embodiment 1, the IO bus is formed as an 8-Lane×4-line serial transmission bus. FIG. 2 only illustrates the single IO bus. As plural IO buses are provided, the order guarantee with respect to the packets on the IO buses during the transfer is indispensable.

Referring to FIG. 2, the CPU 20 is connected to the memory 30. There may be the case where the request which has been kept standby from the respective sources is subjected to busy retry at the pipeline in the CPU 20, that is, it is returned to the inlet of the pipeline so as to be processed again. The precedent request and the subsequent request need the order guarantee for coping with the aforementioned situation.

Figure 3:
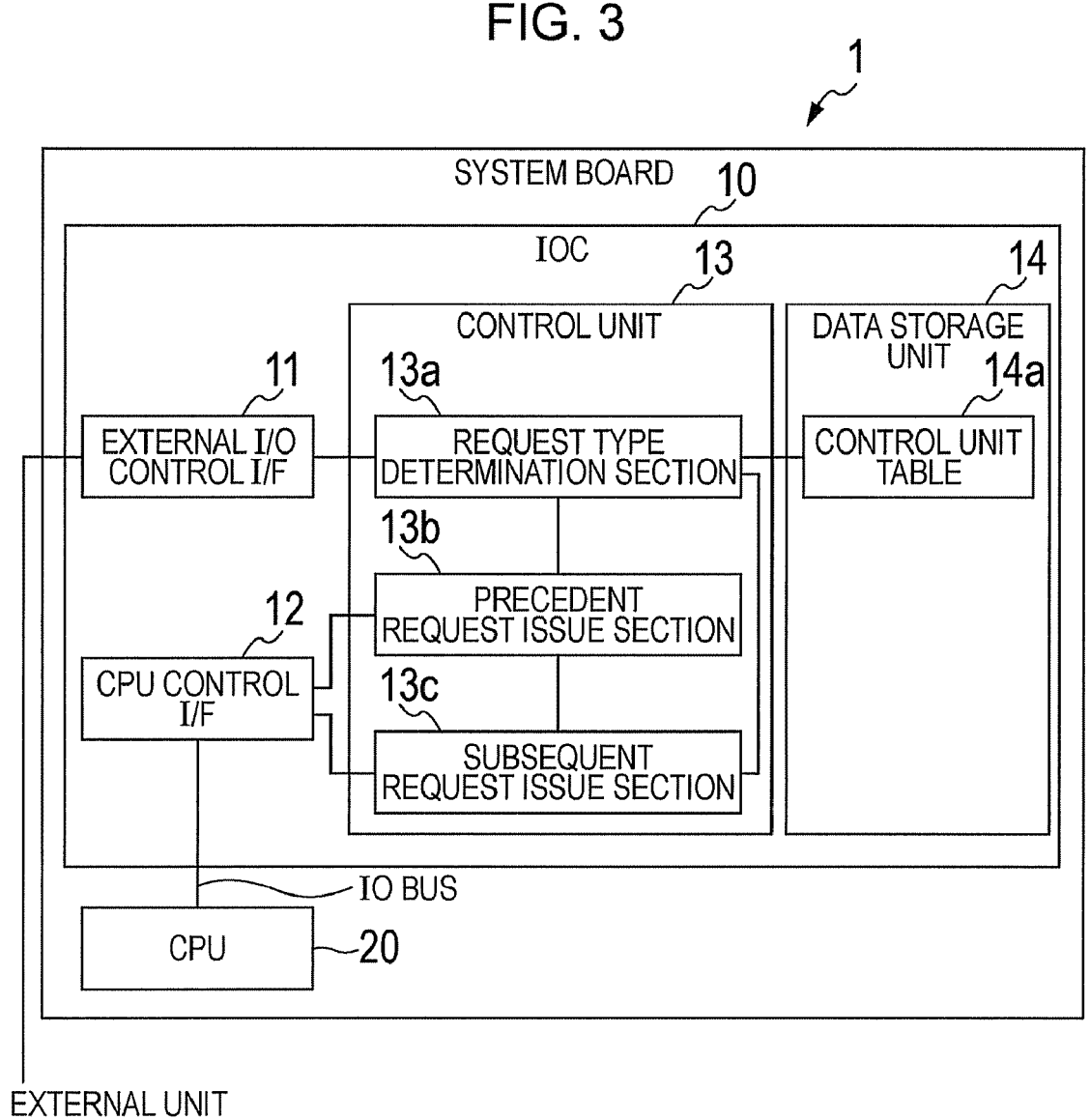
FIG. 3 is a block diagram illustrating a structure of the IOC according to an embodiment 1.
Figure 5:
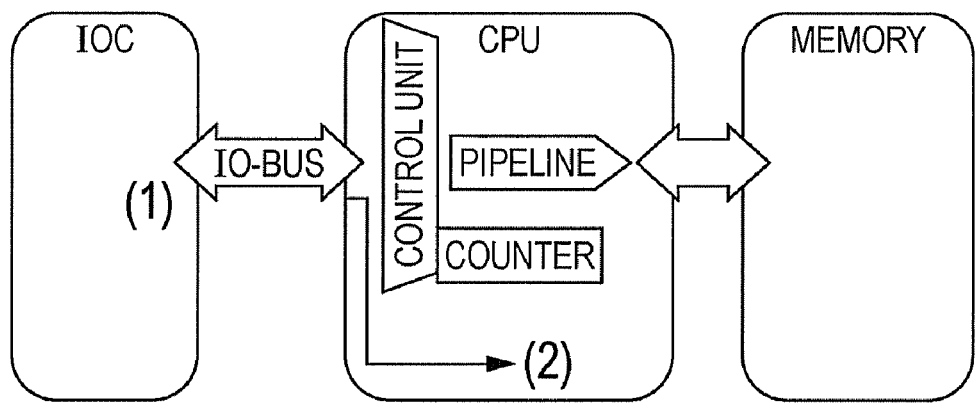
FIG. 5 is an explanatory view illustrating the packet path from the IOC to the memory.

IOC Structure:

The structure of the IOC 10 illustrated in FIG. 1 will be described referring to FIGS. 3 to 5. FIG. 3 is a block diagram illustrating the structure of the IOC according to embodiment 1. FIG. 4 is an explanatory view as an example of a control unit table. FIG. 5 is an explanatory view illustrating a packet path from the IOC to the memory.

Referring to FIG. 3, the IOC 10 according to embodiment 1 includes an external input/output control I/F (interface which applies to the subsequent description) 11, a CPU control I/F 12, a control unit 13, and a data storage unit 14. The CPU control I/F 12 is connected to the CPU 20 via the IO bus. Each processing of the respective units will be described. The I/O controller 10 receives a first and a second requests successively.

The external input/output control I/F 11 controls the communication with respect to various information data to be inputted from or outputted to the external units connected thereto. For example, the external input/output control I/F 11 receives various requests including the one which needs the order guarantee from the external unit.

The CPU control I/F 12 controls the communication with respect to various information data to be sent to or received from the CPU 20 connected thereto. Specifically, the CPU I/F 12 transmits the precedent request to the CPU 20, and then transmits the subsequent request corresponding to the precedent request to the CPU 20. The CPU control I/F 12 receives the notification with respect to completion of the request processing from the CPU 20.

The data storage unit 14 stores the data for various processings to be executed by the control unit 13, the uncompleted request and the program, and includes a control unit table 14a. The control unit table 14a stores data of the device for executing the order guarantee control in correlation with the request type. Referring to the example in FIG. 3, the IOC 10 or the CPU 20 is setted as the unit for executing the order guarantee control. The order guarantee control is executed to prevent the subsequent request from skipping the precedent request.

The control unit table 14a stores "precedent request" which illustrates the type of the precedent request, "subsequent request" which illustrates the type of the subsequent request, and "order control unit" which illustrates the unit for executing the order control so as to prevent the subsequent request from skipping the precedent request, which are correlated with one another. The "All DMA Write/Read" refers to all the DMA Write/Read to be issued by the IOC 10 as the precedent requests. The control unit table 14a is execution information indicating either of the processor and the I/O controller is to supervise initiations of executions of successive requests in accordance with combinations of the types of the successive requests.

The order control unit "IOC" represents that the IOC mainly executes the order control to prevent the subsequent request from skipping the precedent request. The "CPU & IOC" as the order control unit represents that the CPU mainly executes the order control. For example, processing of the "Zero Byte Read" as the subsequent request of No. (4) of the control unit table 14a may be completed inside the IOC. So the subsequent request "Zero Byte Read" does not pass the CPU 20, and accordingly, the CPU is not allowed to execute the order control with respect to the subsequent request "Zero Byte Read". The "IOC" is expected to execute the order control with respect to the "Zero Byte Read" subsequent to the "DMA Write" as illustrated in the control unit table 14.

The response to the subsequent request "PIO Read" of No. (3) of the control unit table 14a illustrated in FIG. 4 may be completed inside the CPU 20 without passing the control unit of the CPU 20 and the pipeline. The subsequent request "PIO Read" does not pass the control unit of the CPU 20 so as not to be allowed to execute the order control with respect to the "PIO Read". Accordingly, in the control unit table 14a, the "IOC" is setted as the order control unit for executing the "PIO Read" subsequent to the "DMA Write".

The CPU 20 is provided with a counter for counting the Write processing (DMA Write) of the precedent request, which will be described in more detail with respect to the structure of the CPU 20 referring to FIG. 6. The counter is structured to increment by 1 (+1) when the precedent request "DMA Write" is entered to the pipeline, and to decrement by 1 (−1) when the memory access is established to guarantee the order. Meanwhile, the precedent request "DMA Read" of No. (5) of the control unit table 14a illustrated in FIG. 4 is not counted by the CPU 20. So the "IOC" is setted as the order control unit in the control unit table 14a.

The control unit 13 includes an internal memory for storing a program which defines various process procedures, and the needed data, and executes various processings in accordance with the program and the needed data. Especially, it further includes a request type determination section 13a, a precedent request issue section 13b, and a subsequent request issue section 13c. The control unit 13 determines whether initiation of each execution of the first and the second requests is to be supervised by either of the processor and the I/O controller in reference to the execution information by the I/O controller, transmits the first request to the processor from the I/O controller, and upon completion of execution of the first request at the processor, transmitting the second request to the processor from the I/O controller when the initiations of executions of the first and second request is supervised by the I/O controller, and transmits the first and second requests to the processor regardless of completion of execution of the first request by the processor when the initiations of executions of the first and second requests is supervised by the processor.

The request type determination section 13a determines whether the request order control is executed by the IOC 10 or the CPU 20 in accordance with the type of the precedent request or the subsequent request. More specifically, upon reception of the IO request which needs the order guarantee from the external input, the request type determination section 13a searches the control unit table 14a for the order control unit corresponding to the precedent request and the subsequent request issued by the control unit 13. That is, the request type determination section 13a searches the control unit table for the request pair corresponding to the "precedent request" which has been received prior to the subsequent request and the "subsequent request" received at the present time as the search keys so as to read the "control unit" corresponding to the searched request pair.

When the request type determination section 13a reads out the "IOC" as the order control unit, it is determined that the request order control is executed by the IOC 10. The determination is sent out to the subsequent request issue section 13c. When the request type determination section 13a reads out the "CPU & IOC" as the order control unit, it is determined that the request order control is executed by the CPU 20 connected to the IOC 10. The determination is then sent out to the subsequent request issue section 13c.

The precedent request issue section 13b issues the precedent request to the CPU 20. More specifically, when the IO request which needs the order guarantee is received by the request type determination section 13a from the external input, the precedent request issue section 13b issues the precedent request to the CPU 20. That is, if the pair of the precedent and the subsequent requests received as the IO request needs the order guarantee, the precedent request issue section 13b issues the precedent request to the CPU 20.

When it is determined to set the CPU 20 to execute the request order control, the subsequent request issue section 13c issues the subsequent request to the CPU 20 following the issue of the precedent request. In this case, the IOC transmits the subsequent request to the CPU without confirming whether the CPU has completed processing the precedent request. When it is determined to set the IOC 10 to execute the request order control, the subsequent request issue section 13c issues the subsequent request to the CPU 20 after completing the process of the precedent request.

Upon reception of the notification that the "CPU & IOC" is setted as the order control unit from the request type determination section 13a, the subsequent request issue section 13c generates a 1-bit skip inhibition flag (STO flag) in the packet of the subsequent request. There may be the case where the requests in the standby state from various sources are busy retried at the pipeline in the CPU 20 for guaranteeing the order of the precedent and the subsequent requests. The aforementioned points will be described in detail accompanied with the description of the CPU structure. Upon reception of the subsequent request in the packet with the skip inhibition flag, an order control section 23a of the CPU 20 to be described later brings the subsequent request into the standby state in a buffer 24a until the precedent request during the processing is in the state of the memory access establishment. Then the subsequent request is sent out to a request processing section 23b so as to be transmitted to the memory 30.

In consideration of the actual wiring length on the board and clock synchronization between the IOC and CPU, the subsequent request issue section 13c issues the subsequent request at sufficient interval from the issue of the precedent request, for example, 20-cycle at 625 MHz. In other words, the subsequent request issue section 13c issues the subsequent request at a sufficient interval from the issue of the precedent request for the purpose of guaranteeing the order on the IO bus. The interval between the precedent request and the subsequent request is determined in consideration of the actual wiring length on the board, or the clock synchronization between the IOC and the CPU.

Upon reception of the notification that the "IOC" is setted as the order control unit from the request type determination section 13a, the subsequent request issue section 13c issues the subsequent request to the CPU 20 after completing the process of the precedent request in the CPU.

CPU Structure:

The structure of the CPU 20 illustrated in FIG. 1 will be described referring to FIGS. 6 and 7. FIG. 6 is a block diagram illustrating the structure of the CPU according to embodiment 1. FIG. 7 is an explanatory view representing how the latency is shortened.

Figure 6:
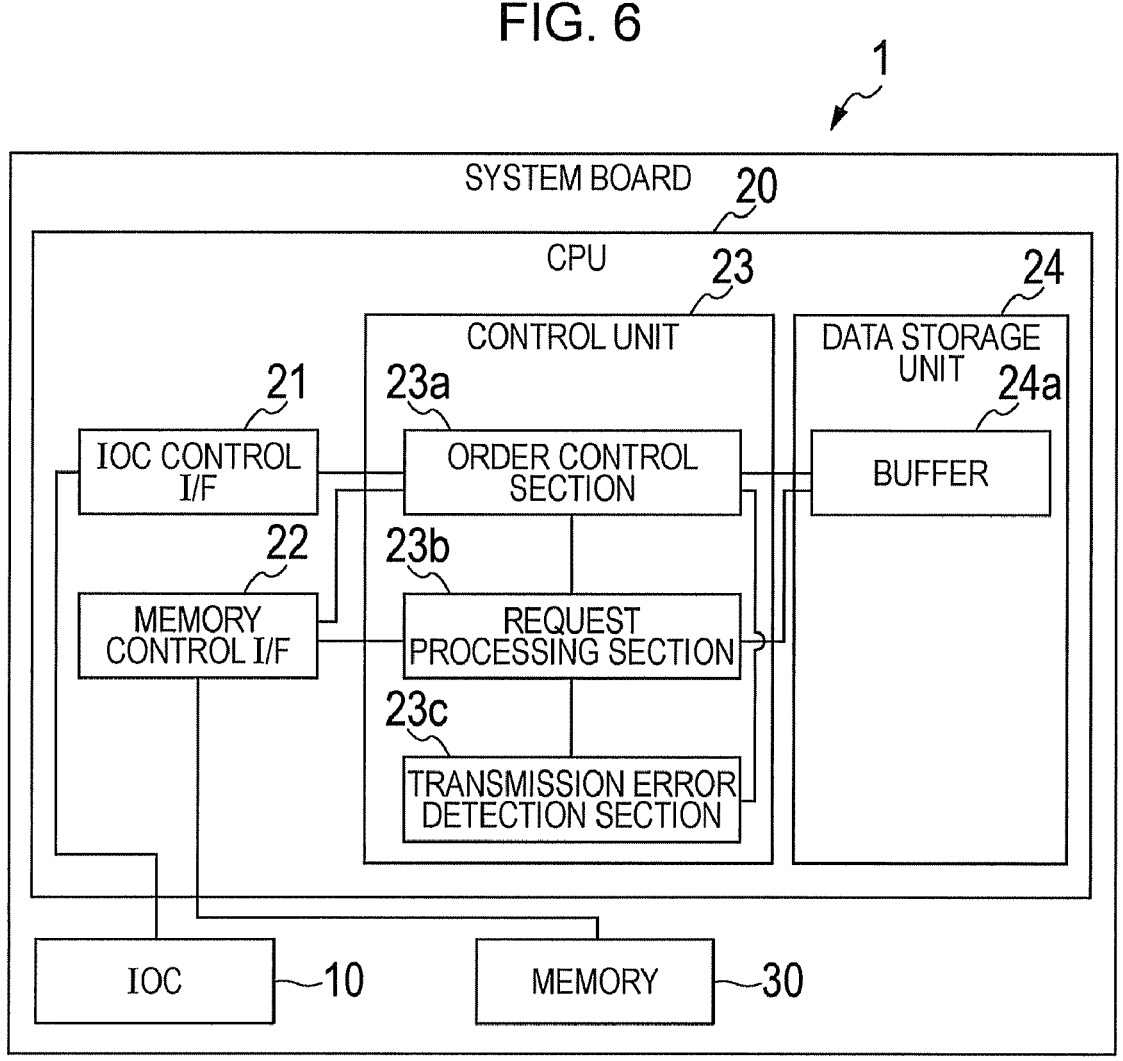
FIG. 6 is a block diagram illustrating a structure of a CPU according to an embodiment 1.
Figure 7:
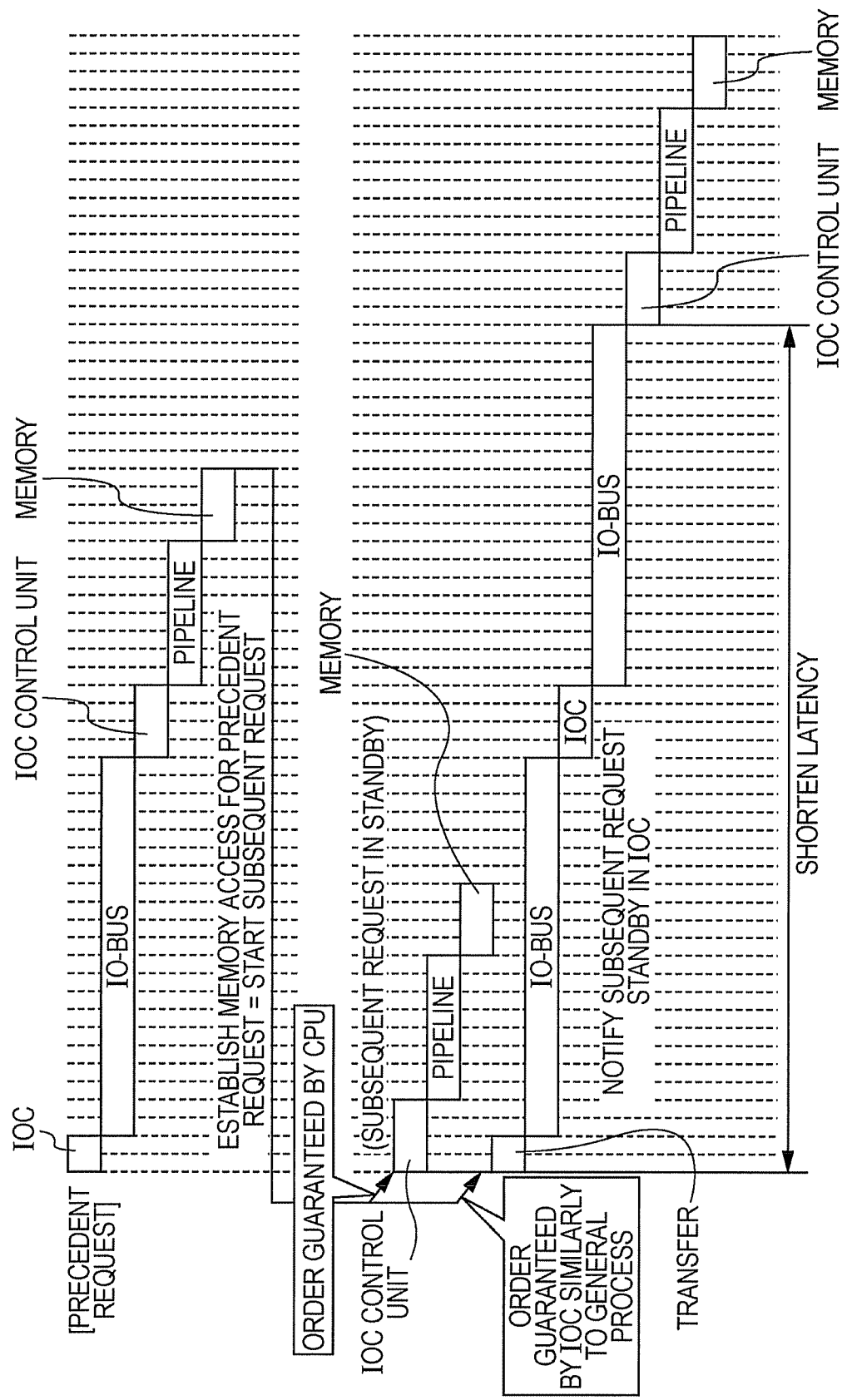
FIG. 7 is an explanatory view illustrating how the latency is shortened.

Referring to FIG. 6, the CPU 20 includes an IOC control I/F 21, a memory control I/F 22, a control unit 23, and a data storage unit 24. The IOC control I/F is connected to the IOC 10 via the IO bus. The memory control I/F is connected to the memory 30. Each processing of the respective units will be described.

The IOC control I/F 21 controls the communication with respect to various information data to be inputted from or outputted to the external device connected thereto. For example, the IOC control I/F 21 receives the request from the IOC 10, and transmits the request completion notification which illustrates the completion of processing the received request to the IOC 10.

The memory control I/F 22 controls the communication with respect to various information data to be transmitted to or received from the memory 30 connected thereto. More specifically, the memory control I/F 22 transmits the request to the memory 30, and receives the processing completion notification with respect to the transmitted request from the memory 30.

The data storage unit 24 stores the data and the program for various data processings executed by the control unit 23. The data storage unit 24 includes a buffer 24a. The order control section 23a to be described later allows the buffer 24a to temporarily store the subsequent request received from the IOC 10.

The control unit 23 includes an internal memory which stores the program that defines various processing procedures, and the needed data, and executes various processings in accordance with the program and the needed data. The control unit includes the order control section 23a, a request processing section 23b and a transmission error detection section 23c.

If the CPU is setted as the order control unit, the order control section 23a controls the request transmission order so as to transmit the precedent request to the memory 30 via the memory control I/F 22, and further to transmit the subsequent request to the memory 30 after completion of processing the precedent request. If the IOC 10 is setted as the order control unit, after establishment of the memory access based on the precedent request, the response to the memory access establishment is transmitted to the IOC 10 via the IOC control I/F 21.

Upon reception of the precedent request from the IOC 10, the order control section 23a sends out the received precedent request to the request processing unit 23 so as to be transmitted to the memory 30. Upon reception of the subsequent request from the IOC 10, the order control section 23a determines whether the skip inhibition flag has been generated in the packet of the received subsequent request.

When the skip inhibition flag has been generated in the packet of the received subsequent request, the order control section 23a stores the subsequent request in the buffer 24a so as to be kept standby in the buffer 24a until establishment of the memory access based on the precedent request during the processing in the CPU. After the establishment, the subsequent request is sent out to the request processing section 23b so as to be transmitted to the memory 30.

Specifically, the order control section 23a includes the counter for counting the precedent request corresponding to the Wright process (DMA Write), which guarantees the order between the requests by incrementing the counter value by 1 (+1) for each entry of the request corresponding to the "DMA Write" to the pipeline, and decrementing the counter value by 1 (−1) upon establishment of the memory access based on the request entered to the pipeline. The system is capable of executing the order control of the precedent request and the subsequent request without requiring the large-scaled buffer for storing the precedent request ID, the request type, and the completion state.

The request processing section 23b enters the request to the pipeline, and sends out the access request to the memory 30. Specifically, upon reception of the precedent request from the order control section 23a, the request processing section 23b enters the received precedent request to the pipeline, and sends the access request to the main memory 30.

Upon reception of the notification that processing of the precedent request has been completed from the memory 30, and the subsequent request from the order control section 23a, the request processing section 23b enters the received subsequent request to the pipeline, and sends out the access request to the memory 30. Thereafter, the request processing section 23b receives the notification with respect to completion of the processing from the memory 30.

The system board 1 allows the CPU 20 to execute the order control in accordance with the request type for reducing the time period for which the IOC 10 waits for completion of processing the precedent request. FIG. 7 illustrates how the latency is reduced. Referring to FIG. 7 representing the process along the time axis, although plural IO-BUS and IOC are illustrated, those elements are not used plurally. Each section defined by the vertical dotted lines represents the single clock cycle. Although the chart is divided into the upper and the lower sections as a matter of convenience, there is no discontinuation between the upper and the lower sections as illustrated by an arrow mark of the drawing.

Specifically, as illustrated in FIG. 7, in the case where the CPU 20 is setted to execute the order guarantee, the system board 1 is capable of reducing the latency by the amount corresponding to the process for transferring the notification with respect to the memory access establishment to the IOC 10 (described as "transfer" and "IO-BUS" in FIG. 7), the process for executing the order control in the IOC 10 (described as "IOC" in FIG. 7), and the process for transferring to the CPU 20 (described as "IO-BUS" in FIG. 7) compared with the case where the IOC 10 is setted to execute the order guarantee, resulting in improved performance to a greater degree.

The transmission error detection section 23c detects the transmission error which occurs on the IOC bus. Specifically, upon detection of the transmission error, the transmission error detection section 23c notifies the IOC 10 of the transmission error and the number of the bus on which the error has occurred. The transmission error detection section 23c destroys all the requests which need the order guarantee to be received by the CPU after occurrence of the transmission error (requests (1), (2) and (6) illustrated in FIG. 4), and instructs the order control section 23a to normally process the requests to be order guaranteed by the IOC 10 (requests (3), (4) and (5) illustrated in FIG. 4).

Upon completion of processing all the requests received prior to the error, the transmission error detection section 23c transmits the re-transmission request of the requests which need the order guarantee, which have been received by the CPU 20 after occurrence of the transmission error to the IOC 10. After an elapse of a set time, the bus degeneracy is released.

Figure 8:
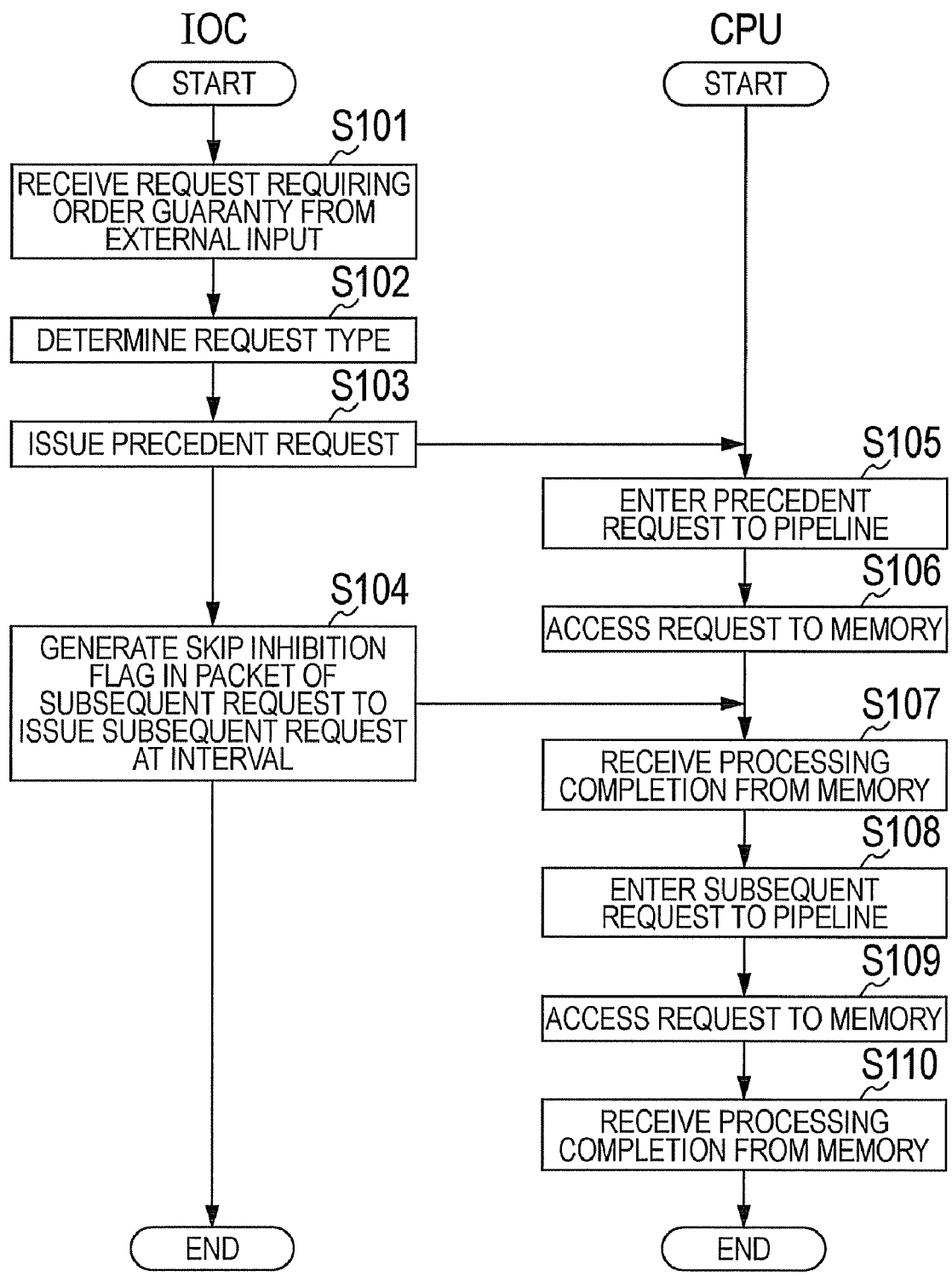
FIG. 8 is a sequence chart illustrating the flow of a request order guarantee process executed in the system board according to an embodiment 1.
Figure 9:
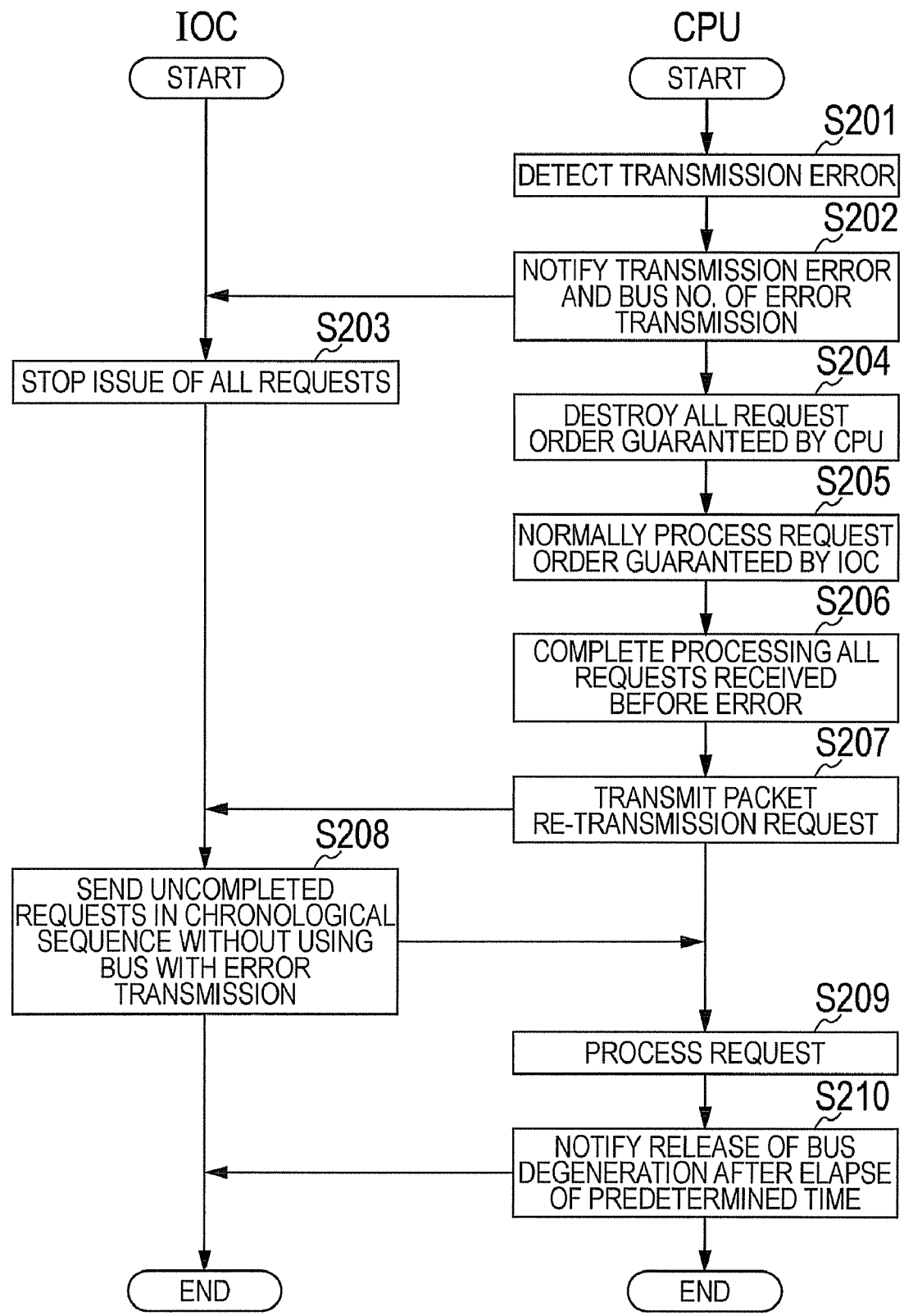
FIG. 9 is a sequence chart illustrating the flow of the request order guarantee process executed in the system board upon occurrence of an error.

Processing with System Board:

The processing performed by the system board according to embodiment 1 will be described referring to FIGS. 8 and 9. FIG. 8 is a sequence chart illustrating the flow of the request order guarantee process executed by the system board according to embodiment 1. FIG. 9 is a sequence chart illustrating the flow of the request order guarantee process executed by the system board according to embodiment 1 in response to the error.

Referring to FIG. 8, upon reception of the request which needs the order guarantee from the external input (step S101), the IOC 10 of the system board 1 determines with respect to the type of the received request. It is then determined whether the order control of the request is executed by the IOC 10 or the CPU 20 in accordance with the determined request type (step S102). In the example illustrated in FIG. 8, the request order guarantee process to be executed by the CPU 20 will be described.

The IOC 10 issues the precedent request to the CPU 20 (step S103). Then the IOC 10 generates the 1-bit skip inhibition flag (STO flag) in the packet of the subsequent request, and issues the subsequent request to the CPU at a sufficient interval from the issue of the precedent request, for example, at the interval of 20-cycle at 625 MHz (step S104).

Upon reception of the precedent request from the IOC 10, the CPU 20 enters the received precedent request to the pipeline (step S105), and sends out the access request to the memory 30 (step S106). Thereafter, the CPU 20 receives the process completion from the memory 30 (step S107). When it is determined that the processing of the precedent request has been completed, the subsequent request is entered into the pipeline (step S108).

The CPU 20 sends out the access request of the subsequent request to the memory 30 (step S109), and receives the process completion from the memory 30 when the processing corresponding to the subsequent request has been completed by the memory 30 (step S110).

The request order guarantee process executed by the system board 1 according to embodiment 1 upon occurrence of error will be described referring to FIG. 9. Referring to FIG. 9, upon detection of the transmission error (step S201), the CPU 20 notifies the IOC 10 of the transmission error, and the number of the bus on which the error occurs (step S202).

Upon reception of the notification of the transmission error from the CPU, the IOC 10 stops issuing all the requests (step S203). The CPU 20 destroys all the requests to be order guaranteed by the CPU among those received from the IOC after occurrence of the transmission error (step S204), and further instructs the order control section 23a to normally process the requests to be order guaranteed by the IOC 10 (step S205).

Upon completion of processing all the requests received from the IOC before occurrence of the error (step S206), the CPU 20 transmits the packet re-transmission request to the IOC 10 (step S207). Upon reception of the re-transmission request from the CPU, the IOC 10 sends out the uncompleted requests in standby state in a chronological order (step S208). At this time, the IOC 10 does not use the IO bus on which the transmission error has occurred. That is, it degenerates the IOC bus on which the transmission error has occurred temporarily, and re-transmits the request using the bus different from the degenerated one.

Thereafter, the CPU 20 processes the requests for a set period (step S209), and notifies the IOC 10 of release of the IO bus degeneracy after an elapse of the set period, and returns to the normal processing.

In the system board 1, the IOC 10 determines whether the request order control is executed by the IOC 10 or the CPU 20 in accordance with the type of the precedent request or the subsequent request. When it is determined that the request order control is executed by the CPU 20, the IOC 10 transmits the subsequent request to the CPU 20 subsequent to the precedent request immediately after transmission thereof without waiting for completion of processing the precedent request executed by the CPU 20. The CPU 20 executes the order control to transmit the precedent request to the memory 30, and further transmit the subsequent request to the memory 30 after completing the processing thereof. The subsequent request may be issued to the CPU 20 while reducing the time period for which the IOC 10 waits for completion of processing the precedent request executed by the CPU 20. As a result, the time taken from reception of the request to completion of processing the subsequent request (latency) may be shortened, thus improving the performance.

In the system board 1 according to embodiment 1, if the subsequent request does not pass the processing unit 23 of the CPU 20, it is determined that the request order control is executed by the IOC 10. The request which does not allow the CPU 20 to execute the order control may be subjected to the order control by the IOC 10.

In the system board 1 according to embodiment 1, the subsequent request is transmitted to the CPU 20 at a predetermined interval from transmission of the precedent request. Sufficient interval from the issue of the precedent request to the issue of the subsequent request ensures the order guarantee on the IO bus.

In the system board 1 according to embodiment 1, if it is determined that the request order control is executed by the IOC 10, the IOC 10 adds the skip inhibition flag to the subsequent request so as to be transmitted to the CPU 20. Upon reception of the subsequent request with the added skip inhibition flag, the CPU 20 transmits the subsequent request with the skip inhibition flag to the memory 30 after completion of processing the precedent request. For example, the counter for managing the memory access completion of the precedent request may be provided in the CPU 20 to execute the order control of the subsequent request with the skip inhibition flag in accordance with the counter. As a result, the order control with respect to the precedent request and the subsequent request may be easily executed without providing the large-scaled buffer for storing the precedent request IDs, the request types, and the completion states of the requests.

In the system board 1 according to embodiment 1, upon detection of the transmission error of the precedent request or the subsequent request, the IOC 10 is notified of the IO bus on which the error has occurred. The precedent request and the subsequent request determined to allow the CPU 20 to execute the order control are destroyed. Then the IOC transmits the precedent request and the subsequent request to the CPU 20 without using the 10 bus on which the notified error has occurred. This makes it possible to allow the appropriate order control in spite of the error.

Embodiment 2

As has been described with respect to the example of the present art, the present art may be formed into various structures. Another example of the present art will be described as embodiment 2 hereinafter.

Order Guarantee on IO Bus:

In embodiment 1, the subsequent request is issued at a sufficient interval from the issue of the precedent request, for example, 20-cycle at 625 MHz for the purpose of ensuring the order on the IO bus. However, the present art is not limited to the aforementioned structure. Plural IO buses, for example, four buses are provided. In embodiment 2, the same IO bus is used for transmitting both the precedent request and the subsequent request for guaranteeing the order on the IO bus.

Figure 10:
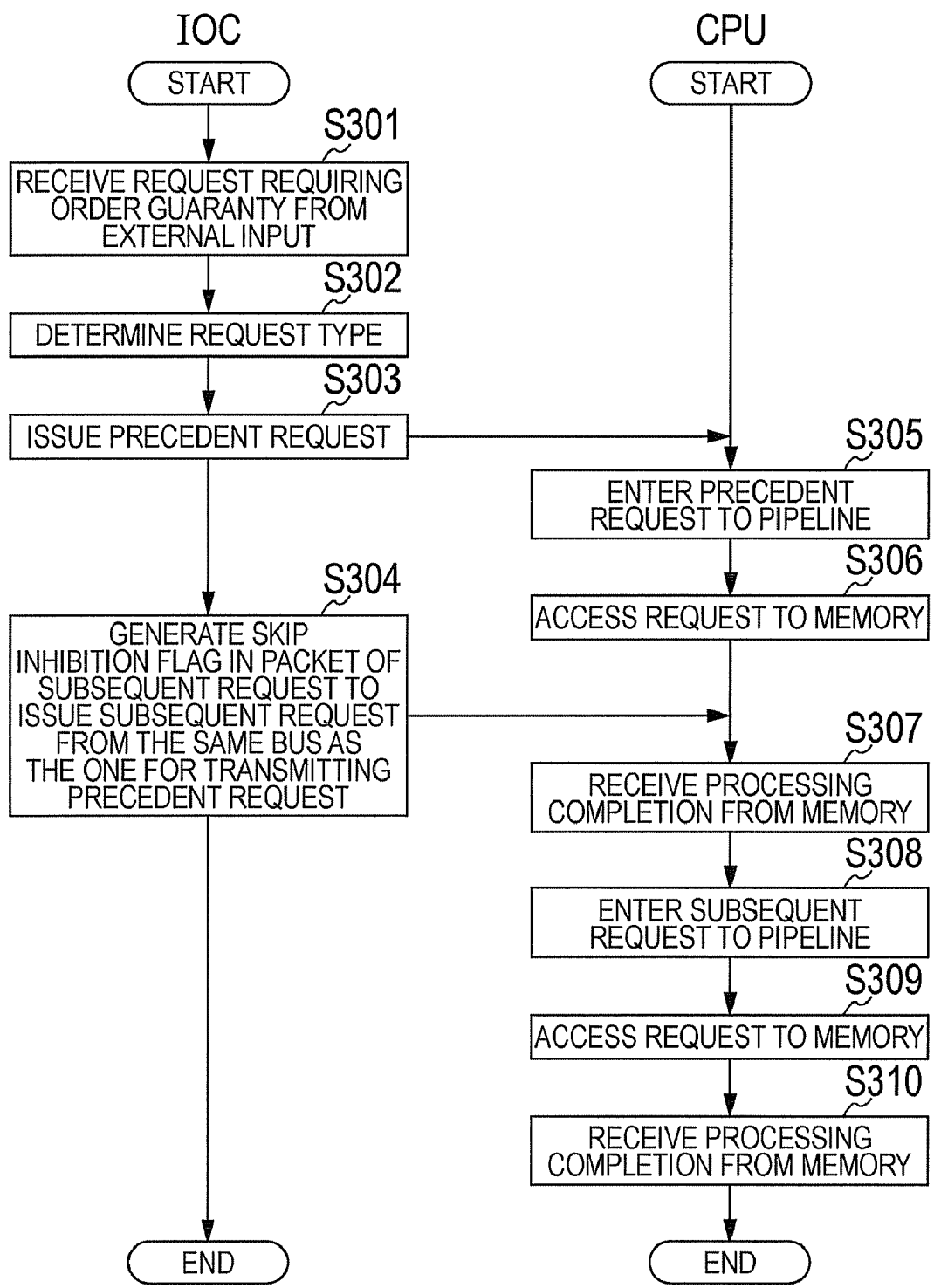
FIG. 10 is a sequence chart illustrating the flow of a request order guarantee process executed in a system board according to an embodiment 2.

Referring to FIG. 10, after issuing the precedent request to the CPU (step S303), the IOC of the system board according to embodiment 2 generates the skip inhibition flag in the subsequent request packet, and issues the subsequent request to the CPU from the same bus as the one used for transmitting the precedent request (step S304).

The IOC of the system board according to embodiment 2 stores the number of the bus to be used for the request transmission upon the issue of the precedent request for unique identification. Upon the issue of the subsequent request to the CPU, if the request which is not to be skipped by the subsequent request exists among the precedent requests, the IOC issues the subsequent request via the bus used for transmitting the subject precedent request. If plural precedent requests which inhibit the skip exist, the same bus as the one used for transmitting the latest precedent request may be used for transmitting the subsequent request.

As the subsequent request may be transmitted on the same 10 bus as the one for transmitting the precedent request, the subsequent request is prevented from skipping the precedent request. This may ensure to guarantee the order between the requests on the 10 bus.

System Structure:

The respective components of the units illustrated are not necessarily formed into the structure physically as in the drawing. The specific structure of dispersion/integration of the respective units is not limited to the one illustrated in the drawing. The entire or the part of the structure may be functionally or physically dispersed/integrated by an arbitrary unit in accordance with the various loads and usages. For example, the precedent request issue section 13b may be integrated with the subsequent request issue section 13c. The processing functions performed in the respective units may be entirely or partially realized by the CPU and the program to be analyzed/executed by the CPU. Alternatively, those functions may be realized by the hardware through the wired logic.

The respective processings automatically executed in the examples may be entirely or partially carried out manually. Conversely, the respective processings manually executed in the examples may be entirely or partially carried out automatically using the known method. The process procedure, control procedure, specific description, and information including various data and parameters in the specification and the drawings may be arbitrarily changed unless otherwise specified.

Program:

The request order control method as described in the examples may be realized by the prepared program executed by the computer such as the personal computer and the work station. The program may be distributed via the network such as internet. The program may be stored in the computer-readable recording medium such as the flexible disk (FD), the CD-ROM and the MO, and read therefrom by the computer for executing the program.

The disclosed system shortens the time period taken from reception of the request to completion of processing the subsequent request, that is, latency so as to improve the performance.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of controlling an information processing apparatus including a memory for storing data, an I/O controller connected to an I/O unit for issuing a plurality of requests corresponding to the data, and a processor connected to the memory and the I/O controller, the method comprising:

determining, by a determining unit included in the I/O controller, whether a guarantee order control of the plurality of requests including precedent requests and subsequent requests, is to be executed by either of the processor and the I/O controller in reference to request types of the precedent requests and the subsequent requests being subsequent to the precedent requests, the guarantee order control being used for preventing the subsequent requests from skipping the precedent requests;

transmitting, by a transmitting unit included in the I/O controller, a subsequent request to the processor after transmitting a precedent request to the processor when the determining unit determines that the guarantee order control is executed by the processor;

transmitting, by a transmitting unit included in the processor, the subsequent request to the memory when the determining unit determines that the guarantee order control is executed by the processor; and transmitting, by a control unit included in the processor, the subsequent request to the memory upon completion of execution of the precedent request at the memory.

2. The method of claim 1, wherein said determining, by the determining unit, determines that the guarantee order control is executed by the I/O controller when the request type of the subsequent request is a request that is executed by the I/O controller.

3. The method of claim 1, wherein said transmitting, by the transmitting unit, transmits the subsequent request to the processor at a predetermined interval from a transmission of the precedent request.

4. The method of claim 1, wherein
the I/O controller and the processor are connected via a plurality of buses, and said transmitting, by the transmitting unit, transmits the subsequent request by a bus included in the plurality of buses, the bus being used when transmitting the precedent request.

5. The method of claim 1, wherein said transmitting, by the transmitting unit,
generates a flag for skip inhibition in the subsequent request and
transmits the subsequent request including the flag to the processor after transmitting the precedent request to the transmitting unit when the determining unit determines that the guarantee order control is executed by the processor, and
said transmitting, by the control unit,
transmits the subsequent request to the memory upon completion of execution of the precedent request at the memory upon reception of the subsequent request including the flag from the transmitting unit.

6. The method of claim 1, comprising:
detecting, by a detecting unit included in the processor, a transmitting error of the precedent request or the subsequent request, the transmitting error which occurs in a bus;
notifying, by the detecting unit, the transmitting unit of the bus in which the transmitting error occurs;
destroying, by the detecting unit, the precedent request and the subsequent request which are determined, by the determining unit, that the guarantee order control is executed by the processor when the detecting unit detects the transmitting error,
and wherein
transmitting, by the control unit, transmits the subsequent request by using an other bus, included in the plurality of buses, expect for the bus in which the transmitting error is detected by the detecting unit.

7. An information processing apparatus including a memory for storing data, an I/O controller connected to an I/O unit for issuing a plurality of request corresponding to the data, and a processor connected to the memory and the I/O controller, the information processing apparatus comprising:
the I/O controller comprising:
a determining unit that determines whether a guarantee order control of the plurality of requests including precedent requests and subsequent requests, is to be executed by either of the processor and the I/O controller in reference to request types of the precedent requests and the subsequent requests being subsequent to the precedent requests, the guarantee order control being used to prevent the subsequent requests from skipping the precedent requests; and
a transmitting unit that
transmits a subsequent request to the processor after transmitting a precedent request to the processor when the determining unit determines that the guarantee order control is executed by the processor and
transmits the subsequent request to the memory when the determining unit determines that the guarantee order control is executed by the processor; and the processor comprising:
a control unit that transmits the subsequent request to the memory upon completion of execution of the precedent request at the memory.

8. The information processing apparatus system of claim 7, wherein
the determining unit determines that the guarantee order control executed by the I/O controller when the request type of the subsequent request is a request that is executed by the I/O controller.

9. The system of claim 7, wherein
the transmitting unit transmits the subsequent request to the processor at a predetermined interval from a transmission of the precedent request to the processor.

10. The information processing apparatus of claim 7, wherein
the I/O controller and the processor are connected via a plurality of buses, and
the transmitting unit transmits the subsequent request by a bus included in the plurality of buses, the bus being used when transmitting the precedent request.

11. The information processing apparatus of claim 7, wherein
the transmitting unit
generates a flag for skip inhibition in the subsequent request and
transmits the subsequent request including the flag to the processor after transmitting the precedent request to the transmitting unit when the determining unit determines that the guarantee order control is executed by the processor, and
the control unit
transmits the subsequent request to the memory upon completion of execution of the precedent request at the memory upon reception of the subsequent request including the flag from the transmitting unit.

12. The information processing apparatus of claim 7, wherein the processor comprises:
a detecting unit that:
detects a transmitting error of the precedent request or the subsequent request, the transmitting error which occurs in a bus,
notifies, by the detecting unit, the transmitting unit of the bus in which the transmitting error occurs, and
destroys the precedent request and the subsequent request which are determined, by the determining unit, that the guarantee order control is executed by the processor when the detecting unit detects the transmitting error, and
wherein the control unit transmits the subsequent request by using an other bus, included in the plurality of buses, except for the bus in which the transmitting error is detected by the detecting unit.

13. The information processing apparatus of claim 7, wherein
said transmitting, by the transmitting unit included in the processor, occurs regardless of completion of execution of the precedent request by the processor.

14. A computer-readable, non-transitory medium storing a program to control an information processing apparatus, the information processing apparatus including a memory to store data, an I/O controller connected to an I/O unit to issue a plurality of requests corresponding to the data, and a processor connected to the memory and the I/O controller, the program causing a computer to execute a process comprising:

determining, by determining unit included in the I/O controller, whether a guarantee order control of the plurality of requests including precedent requests and subsequent requests, is to be executed by either of the processor and the I/O controller in reference to request types of the precedent requests and the subsequent requests being subsequent to the precedent requests, the guarantee order control being used to prevent the subsequent requests from skipping the precedent requests;
transmitting, by a transmitting unit included in the I/O controller, a subsequent request to the processor after transmitting a precedent request to the processor when the determining unit determines that the guarantee order to control is executed by the processor;
transmitting, by a transmitting unit included in the processor, the precedent request to the memory when the determining unit determines that the guarantee order control is executed by the processor; and
transmitting, by a control unit included in the processor, the subsequent request to the memory upon completion of execution of the precedent request at the memory.

15. An I/O controller connected to a processor and an I/O unit, the processor connected to a memory for storing data, the I/O unit to issue a plurality of requests corresponding to the data, the I/O controller comprising:
a determining unit that determines whether a guarantee order control of the plurality of requests including precedent requests and subsequent requests, is to be executed by either of the processor and the I/O controller in reference request types of the precedent requests and the subsequent requests being subsequent to the precedent requests, the guarantee order control being used to prevent the subsequent requests from skipping the precedent requests; and
a transmitting unit that transmits a subsequent request to the processor after transmitting a precedent request to the processor when the determining unit determines that the guarantee order control is executed by the processor.

16. The I/O controller of claim 15, wherein
the determining unit determines that the guarantee order control is executed by the I/O controller when the request type of the subsequent request is a request that is executed by the I/O controller.

17. The system of claim 15, wherein
the transmitting unit transmits the subsequent request to the processor at a predetermined interval from a transmission of the precedent request to the processor.

18. The I/O controller of claim 15, wherein
the I/O controller and the processor are connected via a plurality of buses, and
the transmitting unit transmits the subsequent request by a bus included in the plurality of buses, the bus being used when transmitting the precedent request.

19. The I/O controller of claim 15, wherein
the transmitting unit
generates a flag for skip inhibition in the subsequent request and
transmits the subsequent request including the flag to the processor after transmitting the precedent request to the transmitting unit when the determining unit determines that the guarantee order control is executed by the processor.

* * * * *

UNITED STATES PATENT AND TRADEMARK OFFICE
CERTIFICATE OF CORRECTION

PATENT NO. : 8,185,668 B2
APPLICATION NO. : 12/608231
DATED : May 22, 2012
INVENTOR(S) : Souta Kusachi et al.

It is certified that error appears in the above-identified patent and that said Letters Patent is hereby corrected as shown below:

Column 13, Line 5, In Claim 8, delete "apparatus system" and insert -- apparatus --, therefor.

Column 12, Line 11 (Approx.), In Claim 9, delete "system" and insert -- information processing apparatus --, therefor.

Column 14, Line 44, In Claim 17, delete "system" and insert -- I/O controller --, therefor.

Signed and Sealed this
Thirty-first Day of July, 2012

David J. Kappos
*Director of the United States Patent and Trademark Office*